3,331,877
PROCESS FOR PREPARING 1,3-DIAMINO-PROPANE

Edwin Marvin Smolin, Springdale, Conn., assignor to American Cyanamid Company, Stamford, Conn., a corporation of Maine
No Drawing. Filed Nov. 13, 1963, Ser. No. 323,256
5 Claims. (Cl. 260—585)

This invention relates to a process for the preparation of amino alkanes. More particularly, it relates to an improved process for the preparation of 1,3-diaminopropane.

Several methods are known for the preparation of 1,3-diaminopropane, a compound which imparts desirable qualities to textile resins when used in the form of propylene urea and which is also useful as an intermediate in the preparation of sequestering agents, herbicides and polyamides for use in fibers. These methods are not especially attractive since undesirable by-products are frequently formed during the syntheses. This disadvantageous feature is found, for example, in the procedures described by Michaelis and Graentz, Ber., 30, 1009 (1897), Keppler and Myer, Ber., 25, 2638 (1892), Putochin, Ber., 59, 625 (1926), and Ing and Manske, J. Chem. Soc., 1926, 2348.

According to the present invention, an alkylene bis-oxydipropionitrile is readily converted to 1,3-diaminopropane by heating said alkylene bis-oxydipropionitrile with a hydrogenation catalyst under a suitable hydrogen pressure in the presence of ammonia. In carrying out such process which may be conducted in the presence or absence of a suitable solvent, hydrogenation, hydrogenolysis and ammonolysis occur resulting in good yields of 1,3-diaminopropane, quantitative regeneration of the glycol, and negligible by-product formation. Examples of suitable solvents are methanol, ethanol, tetrahydrofuran and dioxane.

While reduction of alkylene bis-oxydipropionitrile has been previously described, it has usually been observed that under the conditions for such reduction the corresponding diamines are obtained upon absorption of 4 moles of hydrogen. In addition, by-product secondary amines also result. In carrying out the process of the present invention, it is observed that 5 moles of hydrogen are unexpectedly absorbed. Cleavage of two C—O bonds is noted to take place. Surprisingly, the difunctional primary amine, 1,3-diaminopropane, rather than the expected products, i.e., alkylene bis-oxydipropylamine and secondary amine derived therefrom, is obtained.

Nickel and cobalt hydrogenation catalysts have been found effective, especially a catalyst which comprises nickel or cobalt deposited on kieselguhr or Raney nickel or Raney cobalt. When nickel or cobalt catalysts of these types are employed, the hydrogenation may be carried out at a temperature between about 50° C. and 150° C. under a hydrogen pressure of 500–5,000 lbs. per sq. in. The amount of catalyst may be varied over a wide range. In general, 5 to 25 parts of catalyst, with 10 to 15 parts of catalyst being preferred, for each 100 parts of alkylene bis-oxydipropionitrile are employed.

The hydrogenation time may be varied over a period of from about thirty minutes to four hours or longer. When hydrogenation is complete, the catalyst may be filtered off or otherwise separated from the products of the hydrogenation and the 1,3-diaminopropane isolated by fractional distillation which also permits recovery of the glycol.

The alkylene bis-oxydipropionitriles which are employed in the process of this invention may be readily prepared by treating a glycol with acrylonitrile in the presence of a basic substance as a catalyst. A molecular ratio of acrylonitrile to glycol of 2 to 1 or higher may be employed. The reaction of the glycol and acrylonitrile may be carried out by heating the glycol and acrylonitrile preferably in solution and preferably in the presence of a small amount of a substance capable of inhibiting addition polymerization of unsaturated compounds, for example, hydroquinone. It is generaly desirable to employ a considerable excess of acrylonitrile especially 4 to 12 and, more particularly, 5 to 8 molecular proportions for each molecular proportion of glycol. Advantageously, the acrylonitrile and glycol are dissolved in an alcohol containing an alkali metal alkoxide and it is preferable to employ only sufficient alcohol to dissolve the reactants or not much more than that amount. Thus, a concentrated solution of the glycol and acrylonitrile, together with a trace amount of hydroquinone as polymerization inhibitor, in ethyl alcohol to which a little sodium has been added, may be boiled under a reflux for 1 to 3 hours. The alkylene bisoxydipropionitrile separates out upon filtering and cooling of the solution and may, if desirable, be recrystallized. Unchanged acrylonitrile and glycol are recovered from the filtrate, for example, by first distilling off acrylonitrile under atmospheric pressure and then distilling the bulk of the residue under reduced pressure and cooling this second distillate to cause the glycol to separate out.

Illustrative glycols which can be reacted with acrylonitrile to yield the alkylene bis-oxydipropionitriles which are employed in the process of this invention include:

$HOCH_2CH_2OH$
1,2-ethanediol,
$HOCH_2CH_2CH_2OH$
1,3-propanediol,
$HOCH_2CH(CH_3)OH$
1,2-propanediol,
$HO(CH_2)_4OH$
1,4-butanediol,
$HOCH_2CH_2CH(CH_3)OH$
1,3-butanediol,
$HOCH(CH_3)CH(CH_3)OH$
2,3-butanediol,
$(CH_3)_2C(OH)CH_2OH$
2-methyl-1,2-propanediol,
$HOCH_2(CH_2)_2CH(OH)CH_3$
1,4-pentanediol,
$HOCH_2CH_2CH_2CH_2CH_2OH$
1,5-pentanediol,
$HO(CH_2)_6OH$
1,6-hexanediol, and
$HO(CH_2)_{10}OH$
1,10-decanediol.

Thus, alkylene bis-oxydipropionitriles which are obtained from the reaction of the foregoing glycols and acrylonitrile which may be employed in the process of this invention are included in the following non-limiting listing:

$NCCH_2CH_2OCH_2CH_2OCH_2CH_2CN$
3,3'-(ethylenedioxy)dipropionitrile,
$NCCH_2CH_2OCH_2CH_2CH_2OCH_2CH_2CN$
3,3'-(trimethylenedioxy)dipropionitrile,
$NCCH_2CH_2OCH_2CH(CH_3)OCH_2CH_2CN$
3,3'-(propylenedioxy)dipropionitrile,
$NCCH_2CH_2O(CH_2)_4OCH_2CH_2CN$
3,3'-(tetramethylenedioxy)dipropionitrile,
$NCCH_2CH_2OCH_2CH_2CH(CH_3)OCH_2CH_2CN$
3,3'-(1-methyltrimethylenedioxy)dipropionitrile,
$[NCCH_2CH_2OCH(CH_3)-]_2$
3,3'-(1,2-dimethylethylenedioxy)dipropionitrile,
$(CH_3)_2C(OCH_2CH_2CN)CH_2OCH_2CH_2CN$
3,3'-(1,1-dimethylethylenedioxy)dipropionitrile, NCCH$_2$CH$_2$O(CH$_2$)$_3$CH(CH$_3$)OCH$_2$CH$_2$CN
3,3'-(1-methyltetramethylenedioxy)dipropionitrile,
NCCH$_2$CH$_2$O(CH$_2$)$_5$OCH$_2$CH$_2$CN
3,3'-(pentamethylenedioxy)dipropionitrile,
NCCH$_2$CH$_2$O(CH$_2$)$_6$OCH$_2$CH$_2$CN
(3,3'-(hexamethylenedioxy)dipropionitrile, and
NCCH$_2$CH$_2$O(CH$_2$)$_{10}$OCH$_2$CH$_2$CN
3,3'-(decamethylenedioxy)diproprionitrile.

The process is conducted in the presence of an excess of ammonia. Generally, the amount of ammonia employed will be at least four moles for each mole of alkylene bis-oxydipropionitrile but higher amounts are not precluded from use. Such excess of ammonia is essential to repress the formation of secondary amines which may sometimes be formed during the hydrogenation process.

In order to illustrate the principal features of the present invention, the following examples are given.

EXAMPLE 1

A mixture of 34 parts of 3,3'-(ethylenedioxy)dipropionitrile, 5 parts of Raney cobalt hydrogenation catalyst and 31 parts of anhydrous ammonia is charged to a stainless steel outoclave having a capacity of 305 ml. The mixture is heated at 115° C. for a total of 160 minutes during which time hydrogen is added periodically giving a total pressure within the range of 1900–3150 p.s.i.g. At the end of this time, the clave is cooled, vented and the contents worked up in combination with the reaction mixture from Example 2 below.

EXAMPLE 2

A mixture of 152 parts of 3,3'-(ethylenedioxy)dipropionitrile, 22 parts of Raney cobalt hydrogenation catalyst and 136 parts of anhydrous ammonia is charged to a stainless steel autoclave having a capacity of 1725 ml. The mixture is pressured with hydrogen and heated at 113–123° C. for 150 minutes during which time hydrogen is periodically added to keep the total pressure within the range of 2200–2800 p.s.i.g. The reaction mixture is cooled and vented and combined with that from Example 1 above. Fractional distillation of the combined products yields 79 parts of 1,3-diaminopropane and 67.5 parts of ethylene glycol. These amounts represent a yield of 48.5% of 1,3-diaminopropane and 98.5% recovery of the glycol.

EXAMPLE 3

A mixture of 188 parts of 3,3'-(propylene-1,2-dioxy)dipropionitrile, 21 parts Raney cobalt, 356 parts of methanol and 210 parts of anhydrous ammonia is charged to a stainless steel autoclave having a capacity of 1725 ml. The mixture is pressured with hydrogen and heated at 105–113° C. for 168 minutes maintaining the total pressure within the range of 2150–3,000 p.s.i.g. After cooling, venting and fractional distillation, there is recovered 70 parts of 1,3-diaminopropane and 75.5 parts of propylene glycol-1,2 corresponding to yields of 46% and 96%, respectively.

EXAMPLE 4

A mixture of 259 parts of 3,3'-(ethylenedioxy)dipropionitrile, 28 parts of Raney cobalt, 276 parts of methanol and 170 parts of anhydrous ammonia is charged to a stainless steel autoclave having a capacity of 1725 ml. The mixture is pressured with hydrogen and heated at 103–110° C. for 225 minutes maintaining the total pressure at 1500–3,000 p.s.i.g. by periodic additions of hydrogen. The clave and contents are then cooled, vented, filtered and the reaction mixture is distilled fractionally. The recovery of ethylene glycol is practically quantitative and the yield of 1,3-diaminopropane is 49%. In this run and all the others, the pressure drop observed due to the absorption of hydrogen corresponds to 5 moles of hydrogen for each mole of alkylene bis-oxydipropionitrile.

EXAMPLE 5

A mixture of 18 parts of 3,3'-(propylene-1,3-dioxy)dipropionitrile, 4 parts of Raney nickel hydrogenation catalyst, 39.5 parts of methanol and 24 parts of anhydrous ammonia is charged to a stainless steel autoclave having a capacity of 262 ml. The mixture is pressured with hydrogen and heated at 102–108° C. for 30 minutes maintaining a total pressure of 1400–2,000 p.s.i.g. by the periodic addition of hydrogen gas. The clave is cooled, vented and the contents filtered and fractionally distilled. An essentially quantitative recovery of propylene glycol-1,3 is obtained and a yield of 1,3-diaminopropane of 49.5% of theory (7.3 parts) is isolated.

While the foregoing invention has been described in conjunction with certain preferred embodiments, it is to be understood that it is not to be expressly limited thereto but is to be construed broadly and restricted solely by the appended claims.

I claim:

1. A process for preparing 1,3-diaminopropane which comprises heating an alkylene bis-oxydipropionitrile with a nickel or cobalt hydrogenation catalyst under hydrogen pressure and in the presence of excess ammonia.

2. A process as in claim 1 in which the alkylene group of said alkylene bis-oxydipropionitrile is selected from those containing two to ten carbon atoms.

3. A process as in claim 1 in which said hydrogenation catalyst is selected from the group consisting of Raney nickel and Raney cobalt.

4. A process for preparing 1,3-diaminopropane which comprises heating a propylene bis-oxydipropionitrile with a hydrogenation catalyst selected from the group consisting of Raney nickel and Raney cobalt under hydrogen pressure and in the presence of excess ammonia.

5. A process for preparing 1,3-diaminopropane which comprises heating ethylene bis-oxydipropionitrile with a hydrogenation catalyst selected from the group consisting of Raney nickel and Raney cobalt under hydrogen pressure and in the presence of excess ammonia.

No references cited.

CHARLES B. PARKER, *Primary Examiner.*

RICHARD L. RAYMOND, *Assistant Examiner.*